United States Patent

[11] 3,630,080

| [72] | Inventor | Julian S. Taylor<br>8600 S. W. 8th, Oklahoma City, Okla.<br>73128 |
|---|---|---|
| [21] | Appl. No. | 876,349 |
| [22] | Filed | Nov. 13, 1969 |
| [45] | Patented | Dec. 28, 1971 |

[54] TEMPERATURE, PRESSURE AND FLOW RATE SENSING PROBE AND ASSOCIATED GAUGE PLUG
11 Claims, 15 Drawing Figs.

[52] U.S. Cl. ...................................................... 73/212, 73/343, 73/345
[51] Int. Cl. ...................................................... G01p 5/16, G01k 1/14, G01l 19/14
[50] Field of Search ........................................... 73/345, 343, 359, 420, 212; 137/223, 320, 454

[56] References Cited
UNITED STATES PATENTS

| 1,295,046 | 2/1919 | Lohnes .......................... | 73/212 |
| 1,867,779 | 7/1932 | Thompson ..................... | 73/345 |
| 2,239,221 | 4/1941 | Dimmock ...................... | 73/345 |
| 2,618,978 | 11/1952 | Ragland ....................... | 73/420 |

FOREIGN PATENTS

| 520,911 | 3/1931 | Germany ...................... | 137/320 |

Primary Examiner—Louis R. Prince
Assistant Examiner—Denis E. Corr
Attorney—Robert K. Rhea ABSTRACT: A handle-equipped instrument-supporting housing is provided with an elongated centrally bored stem having a socket at its free end for receiving an end portion of a gauge plug. A fluid sensing probe is telescopically received by the housing stem for entering the gauge plug when extended. Probes are provided for sensing temperature, pressure and flow.

PATENTED DEC 28 1971 3,630,080

JULIAN S. TAYLOR
INVENTOR.

BY
Robert K. Rhea
AGENT

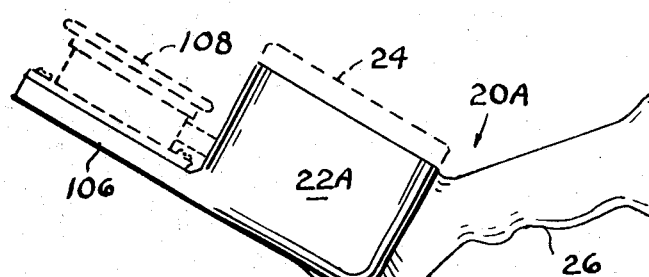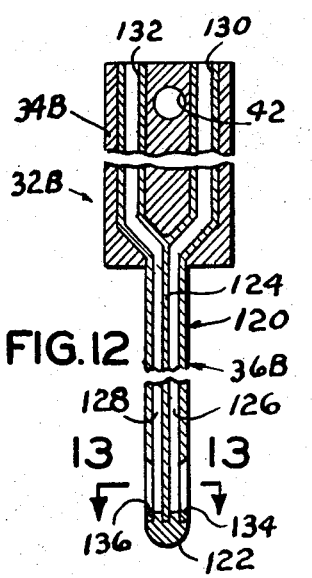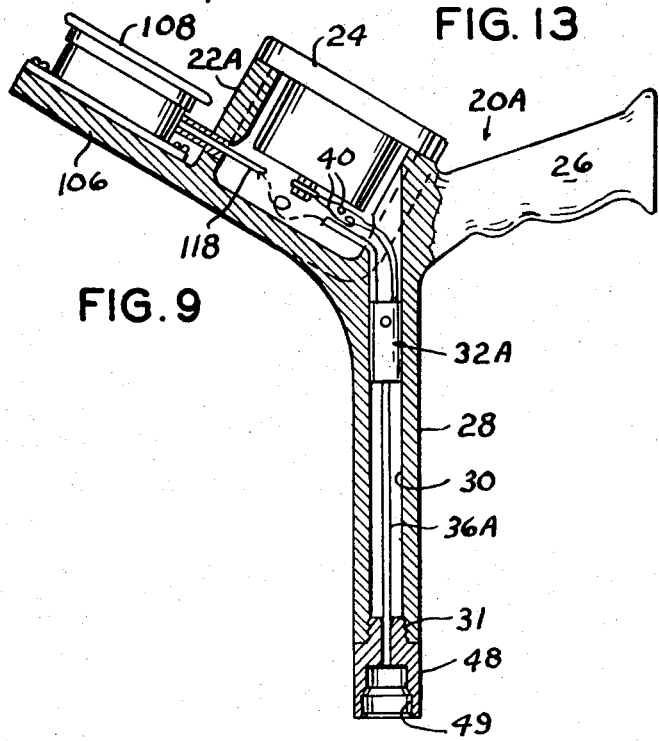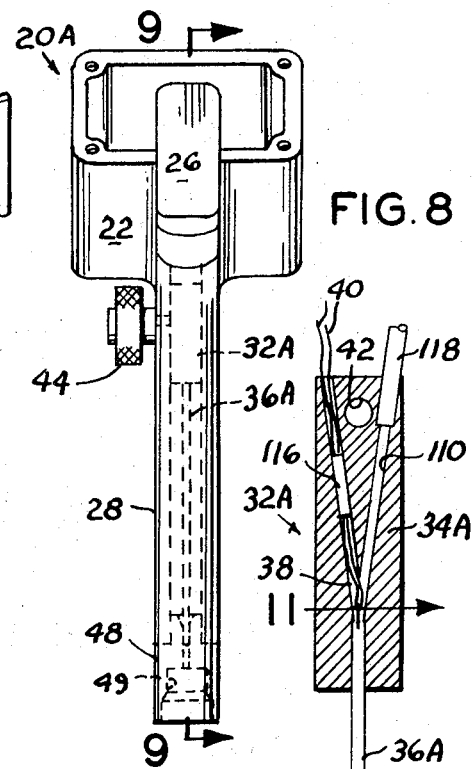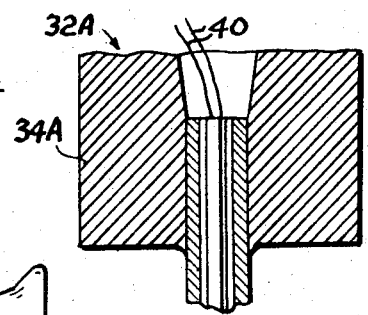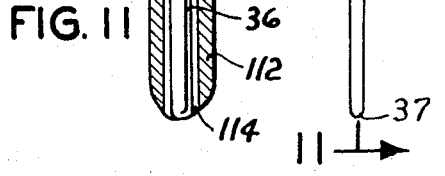

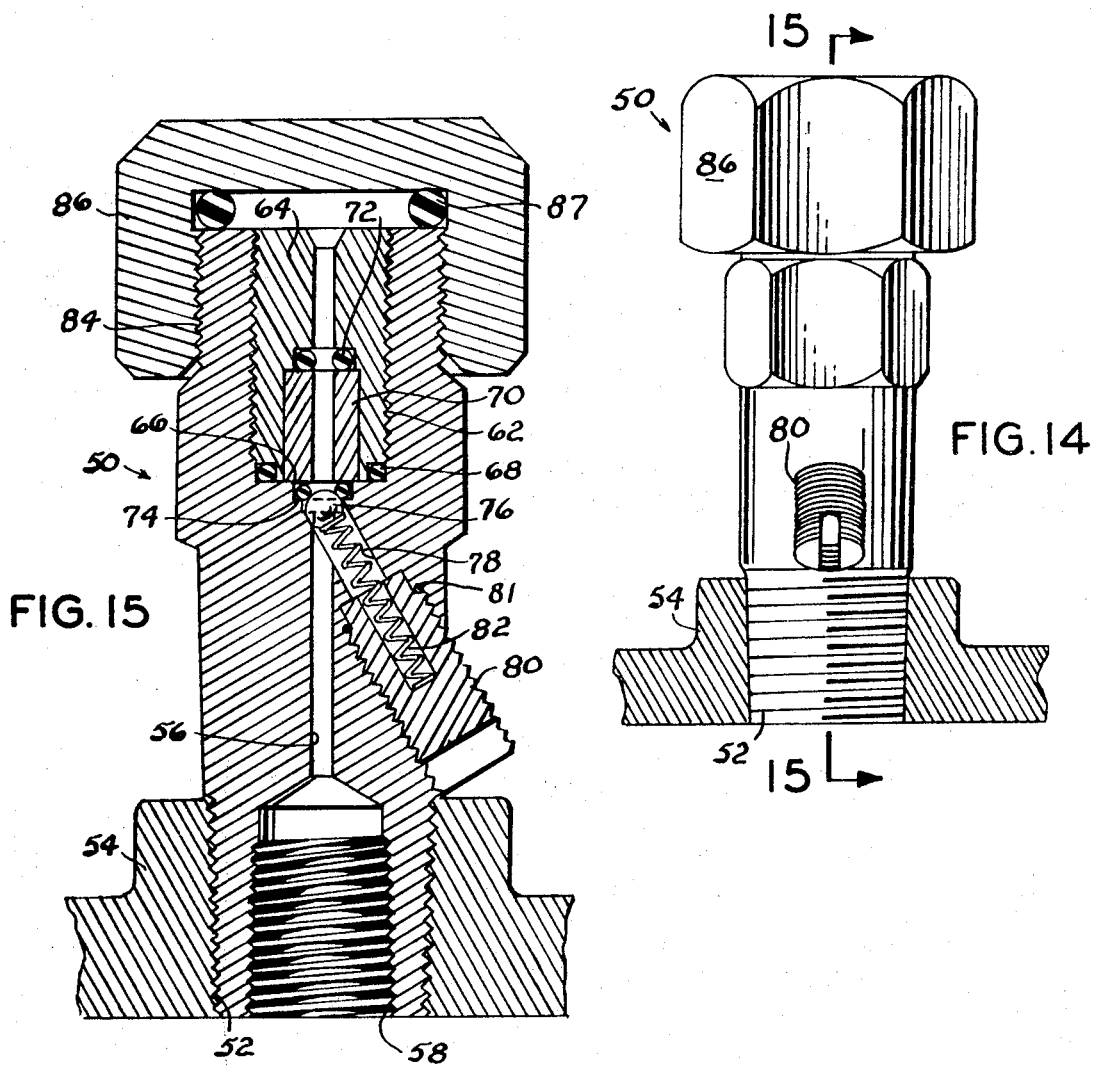

3,630,080

TEMPERATURE, PRESSURE AND FLOW RATE SENSING PROBE AND ASSOCIATED GAUGE PLUG

BACKGROUND OF THE INVENTION

1. Field of the Invention

The present invention relates to temperature- and pressure-measuring means and more particularly to temperature-responsive, pressure-conducting or differential pressure-sensing probes movable into and out of the container through a gauge plug.

Temperature, pressure and flow rate are important variables and must be determined in many processes to achieve the desired results. In some instances the temperature in a container or vessel will vary from one location to another rather than be uniform, therefor, it is usually desirable to obtain temperature readings from preselected positions to obtain an accurate reading. Temperature readings of material within a vessel have usually been obtained by placing a thermocouple in a suitable thermowell attached to the vessel containing the fluid to be gauged. This type of temperature reading has serious shortcomings, such as flow being restricted by the thermowell, the material in the vessel or pipe being gauged causing fouling along the walls of the thermowell, resulting in inaccurate temperature readings.

It is similarly important that a means be provided for indicating pressures of a fluid within a vessel or pipe. It is desired, in obtaining pressure readings of a fluid within a vessel, to use a probe which may be inserted into a gauge plug located at a plurality of positions on the wall of the vessel. Such probe-receiving valves presently used have the bore thereof closed by pressure-responsive, resilient material which tends to deteriorate as a result of heat and pressure during use, therefore, necessitating frequent replacement. Their use is limited to positive pressures.

This invention contemplates the use of a centrally bored plug which is threadedly connected with the wall of a vessel at predetermined locations wherein a ball and seat normally maintains the bore of the plug closed and yet permits unseating the ball by the admission of a probe when it is coaxially inserted into the plug. A thermocouple probe is telescopically received by a centrally bored housing stem and is connected with a pyrometer so that the probe may be telescopically extended from and retracted into the stem and into and out of the plug. The thermocouple probe may be encompassed by a sleeve to provide an annular space between the bore of the sleeve and periphery of the thermocouple probe for simultaneously conducting pressure to a pressure gauge supported by the housing while the pyrometer indicates the temperature. Further, the probe may be formed to be responsive to pressure differential for measuring flow rate.

2. Description of the Prior Art

Pitot tubes have been used for many years to determine flow rate. However, they are usually bulky and do not lend themselves to rapid insertion and retraction. The pitot tube described below is bidirectional and is self-contained in a relatively small single tube, approximately 0.083 inch in diameter.

U.S. Pat. No. 3,114,125 discloses the manner of constructing a temperature probe.

This invention is distinctive over this patent in that it employs substantially any conventional thermocouple slidably supported within a housing including a fluid conductor surrounding the thermocouple and the inclusion of a unique gauge plug.

SUMMARY OF THE INVENTION

A handle-equipped fluid-sensing instrument-supporting housing is provided with a centrally bored elongated stem portion for slidably receiving, in telescoping relation, an elongated probe connected with the instrument. A centrally bored gauge plug is threadedly connected with the wall of a vessel. The bore of the plug contains a seat. An angular bore in the plug intersects the central bore and contains a ball valve normally urged toward the seat for closing the bore of the plug. The free end of the housing stem coaxially surrounds the outwardly disposed end portion of the plug so that the probe, when moved out of the housing stem, enters the bore of the plug for unseating the ball and entering the vessel.

The principal objects of this invention are to provide a fluid-sensing instrument-supporting means slidably supporting a probe coaxially received by a gauge plug for indicating temperature, pressure or fluid flow rate within a vessel or pipe.

BRIEF DESCRIPTION OF THE DRAWINGS

FIG. 7 is a side elevational view of an alternative embodiment of the probe-holding housing illustrating, by dotted lines, a pyrometer and pressure gauge mounted thereon;

FIG. 8 is a right side view of FIG. 7 with the pyrometer and pressure gauge removed;

FIG. 9 is a vertical cross-sectional view, partially in elevation, taken substantially along the line 9—9 of FIG. 8 and illustrating the relationship of a pyrometer and pressure gauge when mounted on the housing;

FIG. 10 is a vertical cross-sectional view, partially in elevation, of the temperature and pressure probe, per se;

FIG. 11 is a fragmentary vertical cross-sectional view, to an enlarged scale, taken substantially along the line 11—11 of FIG. 10;

FIG. 12 is a fragmentary vertical cross-sectional view, to a different scale, of a pitot tube probe;

FIG. 13 is a horizontal sectional view taken substantially along the line 13—13 of FIG. 12;

FIG. 14 is an elevational view, partially in section, to a different scale, of the gauge plug connected with a fragment of a vessel wall; and, FIG. 15 is a vertical cross-sectional view, to a larger scale, taken substantially along the line 15—15 of FIG. 14.

DESCRIPTION OF THE PREFERRED EMBODIMENTS

Figure 1:
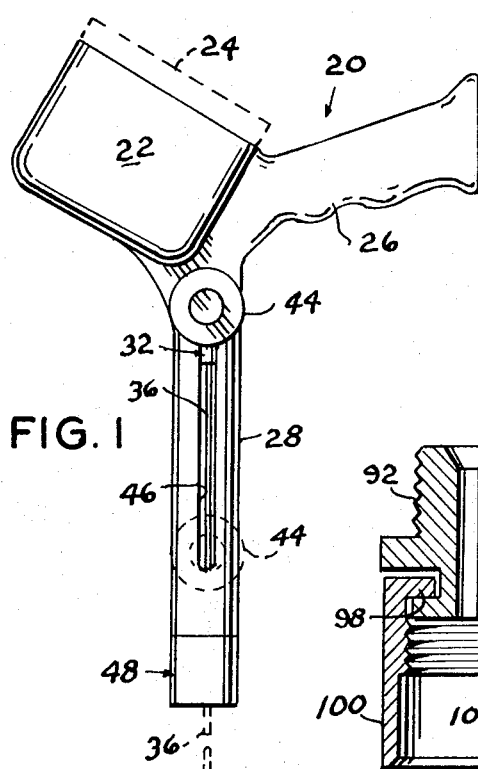
FIG. 1 is a side view of a temperature probe housing illustrating, by dotted lines, a pyrometer supported thereby and a probe in extended position.
Figure 2:
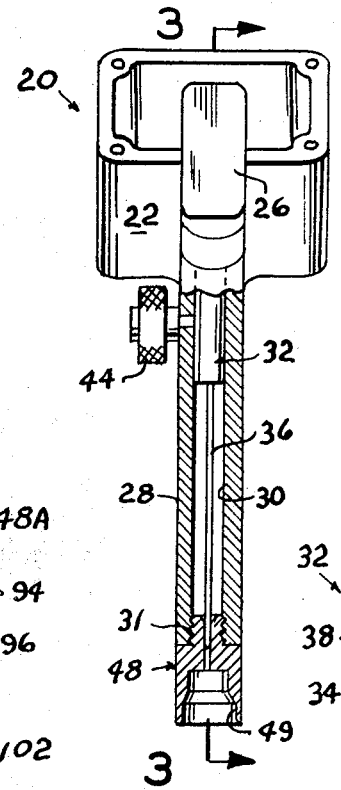
FIG. 2 is a right side view of FIG. 1, partially in section, with the pyrometer removed.

Like characters of reference designate like parts in those figures of the drawings in which they occur.

Figures 4, 5:
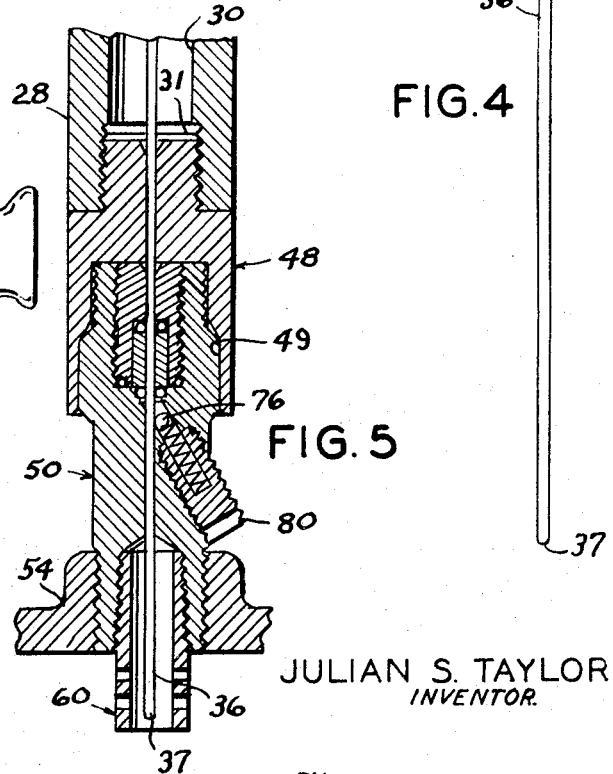
FIG. 4 is a vertical sectional view, partially in elevation, of the probe, per se.
FIG. 5 is a fragmentary vertical cross-sectional view of the depending end portion of the probe-containing housing connected with a probe receiving plug secured to a fragment of a vessel wall.

In the drawings:

Referring more particularly to FIGS. 1 to 4, the reference numeral 20 indicates a temperature probe supporting housing having a boxlike body portion 22 for receiving and supporting a pyrometer 24, or the like, and having a handle 26. The housing further includes an elongated stem portion 28 which is centrally drilled, as at 30, and internally threaded at its free end, as at 31, for communication with the interior of the box portion 22 and encompassing a temperature probe 32 (FIG. 4).

The probe 32 includes a cylindrical guide portion 34, at one end, coaxially received slidably by the bore 30 of the housing. An elongated, diametrically relatively small, conventional thermocouple contained by a rodlike sheath 36 and having the juncture of its dissimilar elements at its remote end 37, is coaxially connected to the guide 34. The guide 34 is provided with an angular bore 38 which receives wires 40, forming a part of the rod 36, which are in turn connected with the pyrometer 24. The upper end portion of the guide 34 is transversely bored and threaded, as at 42, for threadedly receiving the stem of a thumbscrew 44.

The wall of the housing stem 28 is provided with a longitudinally extending slot 46, intermediate its ends, permitting movement of the thumbscrew 44 longitudinally of the slot 46 for extending and retracting the rod 36. A connector 48 is threadedly connected with the free end of the housing stem 28. The connector 48 is centrally bored for cooperative reception of the rod 36 and is provided with a step-diametered socket 49 in its free end for receiving the hereinafter described gauge plug.

Referring more particularly to FIGS. 14 and 15, the reference numeral 50 indicates a probe receiving gauge plug which is cylindrical in general configuration having one end provided with threads 52 for threadedly engaging the wall of a vessel 54 or container having fluid therein, not shown. The gauge plug 50 is provided with a coaxial bore 56 sized for slidably receiving the rod 36. The inwardly directed end of the plug is counterbored and threaded, as at 58, for receiving a guard tube 60 (FIG. 5) having an apertured wall for the purposes presently explained.

The other end of the plug 50 is counterbored and threaded, as at 62, for receiving a bushing 64 which seats against an annular shoulder 66 formed by the threaded counterbore 62. The inwardly directed end of the bushing 64 is provided with an annular recess for receiving a packing member, such as an O-ring 68. The inwardly directed end of the bushing 64 is counterbored for receiving a sleeve 70 and an O-ring or packing member 72. The bushing 64 and sleeve 70 are centrally drilled diametrically substantially equal with respect to the plug bore 56 to provide a passageway through the plug for communication with the interior of the vessel 54. The bore of the plug is diametrically enlarged adjacent the end of the sleeve 70 opposite the packing member 72 for receiving a packing member 74 and forming a seat for a ball valve 76 for opening and closing the passageway 56. The wall of the plug 50 is provided with an angular bore 78 intersecting the bore 56 adjacent the valve seat 74 for movement of the ball valve 76 within the bore 78 toward and away from its seat. The wall of the plug 50 is counterbored concentric with the angular bore 78 for threadedly receiving a spring support 80. The inward end of the spring support 80 is sealed in the counterbore by an O-ring 81 and is centrally drilled for nesting one end portion of a spring 82 having its other end contacting the ball valve 76 for normally urging the ball valve toward its seat 74. The outwardly disposed end of the plug 50 is externally threaded, as at 84, for receiving a cap 86 containing a seal 87 when the gauge plug is not being used.

Referring also to FIG. 5, the connector socket 49 cooperatingly receives the free end portion of the plug 50 when the cap 86 is removed. The thumbscrew 44 is loosened and moved longitudinally of the slot 46 to extend the rod 36 out of the tubular housing stem 28 and into the bore of the plug 50. The free end of the rod 36 contacts and unseats the ball valve 76 so that the latter enters the angular bore 78 to permit passage of the rod 36 through the plug bore 56 and inwardly of the vessel 54 where the free end of the rod is then surrounded by the fluid within the vessel to obtain a temperature reading by the pyrometer 24. The purpose of the wall apertured pipe 60 is to prevent damage to the rod 36 by high-velocity fluids or material moving in the fluid within the vessel or pipe. After obtaining a temperature reading, the rod 36 is retracted into the housing stem by the thumbscrew 44 wherein the O-ring 72 forms a fluidtight seal around the rod 36 and prevents any loss of fluid during the time the rod is inserted into the vessel and during its removal from the plug prior to the time the spring 82 again seats the ball valve 76 on its seat 74.

Figure 6:
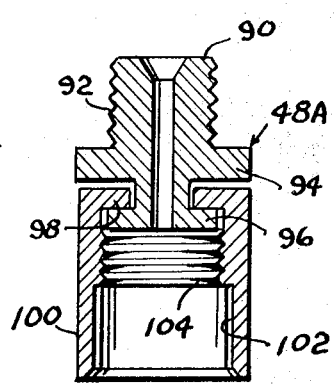
FIG. 6 is a fragmentary vertical cross-sectional view, to a larger scale, of an alternative connector for connecting the probe housing to a gauge plug.
Figure 3:
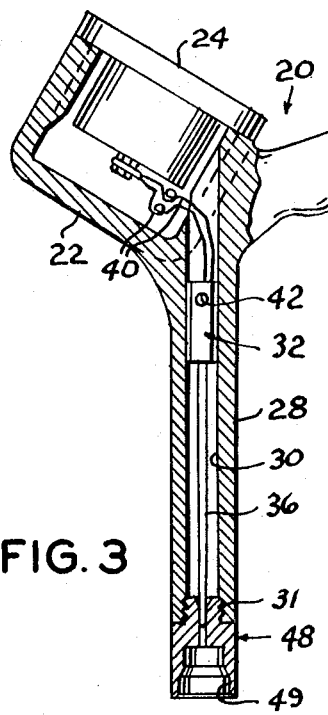
FIG. 3 is a vertical cross-sectional view, partially in elevation, taken substantially along the line 3—3 of FIG. 2 and including a pyrometer.

An alternative embodiment of the housing and plug connector is indicated at 48A (FIG. 6) which is formed in two sections comprising a centrally drilled adapter 90 rotatably connected with a sleeve 100 to provide a swivel action. One end of the adapter is provided with threads 92 for engagement with the housing stem threads 31 and its opposite end portion is provided with longitudinally spaced annular flanges 94 and 96 forming a recess therebetween which receives an inwardly directed flange 98 on one end of the sleeve member 100. The other end of the sleeve member 100 is step diameter counterbored, as at 102, for surrounding the plug 50 and is threaded, as at 104, for engagement with the plug threads 84 so that the sleeve member 100 may be threadedly connected with the plug and support the housing 20 thereon. This is for the purpose of leaving the housing 20 connected with the plug 50 for selected times.

Referring also to FIGS. 7 to 11, inclusive, an alternative embodiment of the housing is illustrated at 20A which is substantially identical with respect to the housing 20 with the exception that one wall of the housing container 22A is extended to form a platform 106 which supports a pressure gauge 108. In this embodiment the probe 32A, having a cylindrical guide portion 34A, is modified to provide an additional angularly inclined bore 110 which communicates with the inwardly disposed end of the probe rod 36A. The probe rod 36A comprises the temperature responsive or sensing element 36 which is surrounded by a sleeve 112 to provide an annular space 114, longitudinally of the probe rod 36A, open at the free end of the probe and communicating with the angular bore 110. The wires 40 are sealed within the guide 34A by bonding material indicated at 116. Flexible tubing 118 connects the angular bore 110 and annular space 114 with the pressure gauge 108 so that when the housing 20 is connected with the plug 50, as described hereinabove and the probe rod 36A extended inwardly of the vessel 54, pressure and temperature may be indicated by the pressure gauge and pyrometer, respectively.

Referring also to FIGS. 12 and 14, the device may also be used for gauging fluid flow within the vessel. This is accomplished by modifying the probe, as indicated at 32B wherein the guide member 34B is coaxially connected with a pitot tube 36B comprising a tube 120 having its free end closed by a semispherical plug 122. The tube 120 is longitudinally divided by a partition 124 to form opposing semicircular passageways 126 and 128. The cylindrical guide portion 34B is provided with cooperating apertures or passageways 130 and 132 communicating with the passageways 126 and 128. The plane of the partition 124 is parallel with respect to the axis of the thumbscrew-receiving aperture 42 so that the position of the passageways 126 and 128, with respect to the direction of fluid flow within a pipe or vessel, may be determined. The wall of the tube 120 is longitudinally slotted, as at 134 and 136, adjacent the plug 122 on opposite sides of the partition 124 for obtaining fluid pressure differential. This is accomplished by replacing the pyrometer or pressure gauge with a manometer or differential pressure gauge or transducer, not shown, and connecting it by flexible tubes in a conventional manner to the passageways 130 and 132. The housing 20 is then positioned on or connected with the gauge plug 50, with the housing handle 26 parallel with respect to the direction of fluid flow which positions the probe partition 124 perpendicular with respect to the direction of fluid flow within a pipe where flow is being measured. The probe tube 36B is extended by means of the thumbscrew 44 and fluid flow entering the passageways 126 and 128 will be at slightly different pressures, as a result of the position of the tube 36B with respect to the direction of flow. Fluid impinges on the upstream side of the partition 124 through one of the slots 134 or 136 communicating with the respective passageway 126 or 128 while on the opposite downstream side of the partition 124 fluid movement is away from the other slot and its passageway to generate a pressure differential which is indicated by the manometer or differential pressure transducer to indicate flow rate for a given size pipe or flow passageway.

Obviously the invention is susceptible to changes or alterations without defeating its practicability therefore, I do not wish to be confined to the preferred embodiment shown in the drawings and described herein.

I claim:

1. A temperature- and pressure-sensing apparatus, comprising:
   a housing having an elongated laterally projecting tubular stem,
      said stem having a longitudinally aligned slot in its wall intermediate its ends;
   gauge means;
   probe means coextensive with said stem and connected, at one end portion, with said gauge means and slidably supported by said stem for movement of its other end portion out of said stem a distance equal to the length of the slot in said stem; and,
   centrally bored gauge plug means forming a passageway for said probe means,
      said gauge plug means including valve means normally closing the passageway intermediate its ends.

2. Structure as specified in claim 1 in which said gauge plug means comprises:
   a generally cylindrical body having a wall,
      said wall having an annular recess intermediate its ends forming a valve seat surrounding the central bore of said body,
      said wall having a lateral bore intersecting the central bore and communicating with said valve seat;
   a valve within the lateral bore; and,
   spring means within the lateral bore biasing said valve toward said seat.

3. Structure as specified in claim 2 in which said gauge plug means is counterbored at one end portion, and
   packing means within the counterbore frictionally surrounding said probe means.

4. Structure as specified in claim 2 in which said gauge means includes:
   a pyrometer connected with said gauge means.

5. Structure as specified in claim 4 in which said probe means includes a thermocouple.

6. Structure as specified in claim 5 in which said gauge means further includes:
   a pressure gauge,
      said probe means further including:
   a sleeve encompassing said thermocouple and forming an annular passageway therearound.

7. Structure as specified in claim 5 and further including:
   a guide connected with the end portion of said thermocouple adjacent said housing for moving said thermocouple into and out of the passageway of said gauge plug body.

8. Structure as specified in claim 2 in which said gauge means comprises:
   a differential pressure indicator having flow rate calibrations.

9. Structure as specified in claim 8 in which said probe means comprises:
   an elongated tube having one closed end and having a wall;
   a partition longitudinally dividing said tube and forming opposing passageways;
   means connecting the passageways with said differential pressure indicator,
      the wall of said tube having diametrically opposed openings on respective sides of said partition adjacent the closed end of said tube.

10. Structure as specified in claim 2 in which said gauge means and said probe means comprises:
    a pyrometer;
    a pressure gauge;
    a thermocouple connected with said pyrometer;
    a guide connected with the end portion of said thermocouple adjacent said housing for moving said thermocouple into and out of the passageway of said gauge plug; and,
    a sleeve encompassing said thermocouple and forming an annular passageway around said thermocouple,
       said guide having a passageway providing communication between the annular passageway around said thermocouple and said pressure gauge.

11. Structure as specified in claim 2 and further including:
    a connector coaxially secured to the end of said stem opposite said housing,
       said connector having a socket for coaxially nesting an end portion of said gauge plug means,
       said connector having a bore nesting the adjacent end portion of said probe in coaxial alignment with the passageway in said gauge plug.

* * * * *